United States Patent
Tada et al.

[11] 4,081,837
[45] Mar. 28, 1978

[54] UNDESIRED SIGNAL CANCELLER

[75] Inventors: Masahiro Tada; Takao Sumi, both of Tokyo; Masayuki Hongu, Komae; Yoshio Ishigaki, Tokyo, all of Japan

[73] Assignee: Sony Corporation, Tokyo, Japan

[21] Appl. No.: 698,674

[22] Filed: Jun. 22, 1976

[30] Foreign Application Priority Data
Jul. 1, 1975    Japan .................................. 50-81250

[51] Int. Cl.² ........................... H04N 5/21; H04B 1/10
[52] U.S. Cl. ..................................... 358/167; 358/905; 325/477
[58] Field of Search ............... 358/36, 167, 187, 188; 325/473–477, 479, 472; 328/162, 163, 165, 167; 330/70 T

[56] References Cited
U.S. PATENT DOCUMENTS

| 2,448,635 | 9/1948 | Smith | 358/167 |
| 3,213,450 | 10/1965 | Goor | 325/476 |

Primary Examiner—John C. Martin
Attorney, Agent, or Firm—Lewis H. Eslinger; Alvin Sinderbrand

[57] ABSTRACT

An undesired signal canceller for a composite amplitude modulated signal including an undesired signal delayed by a time $\tau_o$ from a desired signal. The composite signal is supplied to a detector circuit. A carrier signal of the same frequency as that of the amplitude modulated carrier and delayed in phase by the time $\tau_o$ is produced. This carrier signal is amplitude modulated with a signal formed by delaying the output signal from the detector circuit by the time $\tau_o$, and the amplitude modulated carrier signal is combined with the composite amplitude modulated signal to cancel the undesired signal therefrom.

17 Claims, 29 Drawing Figures

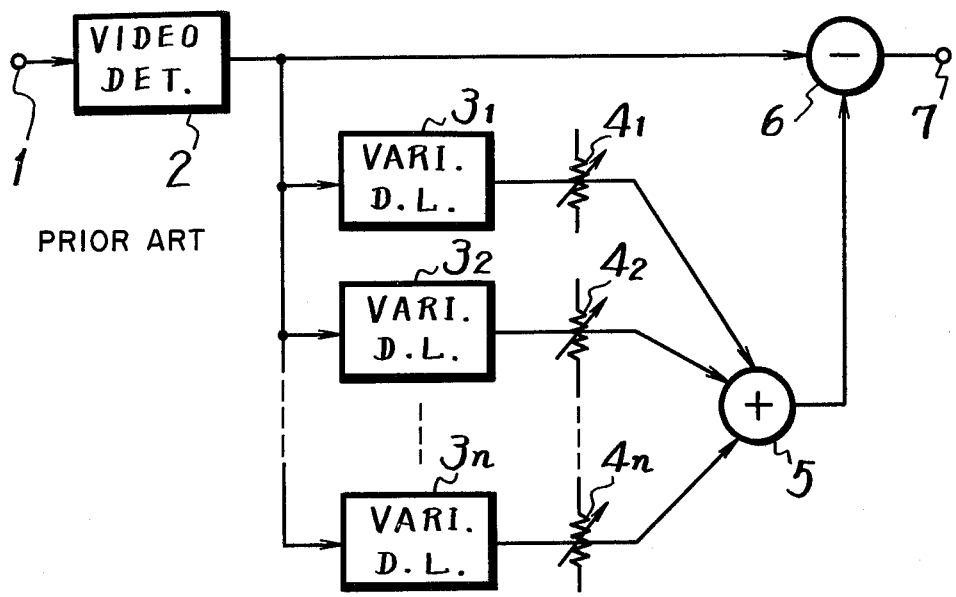
Fig.1 PRIOR ART
Fig.2A
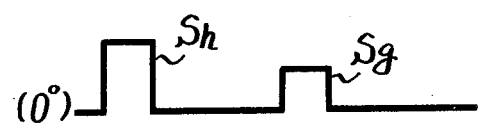
Fig.2B (0°)
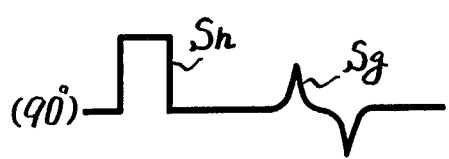
Fig.2C (90°)
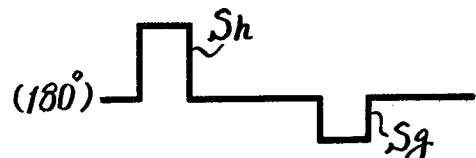
Fig.2D (180°)
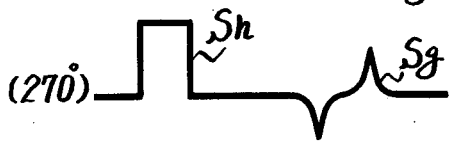
Fig.2E (270°)

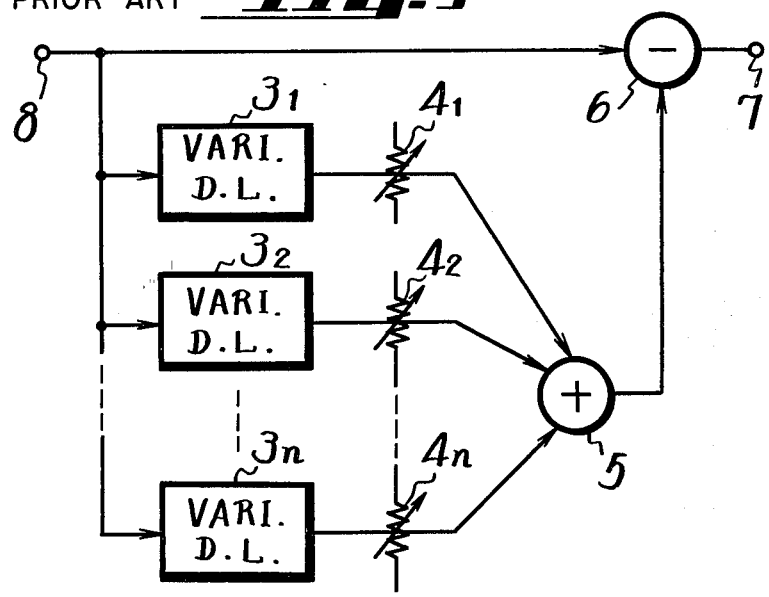
PRIOR ART Fig-3
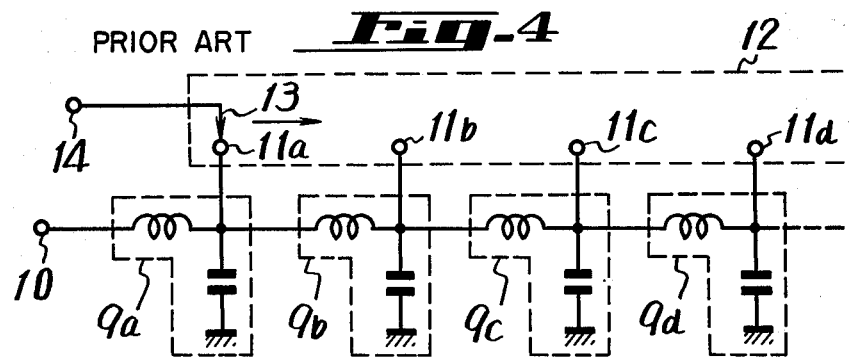
PRIOR ART Fig-4
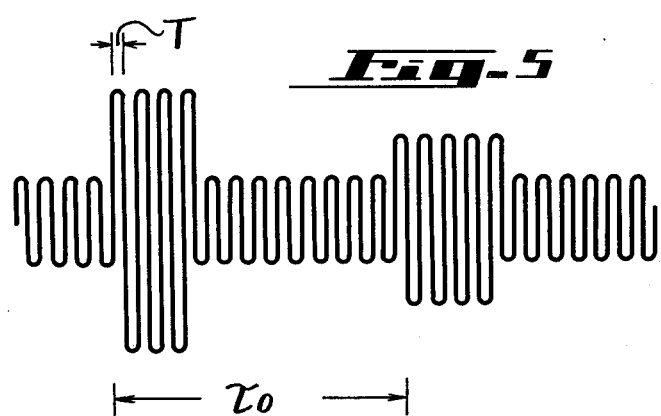
Fig-5

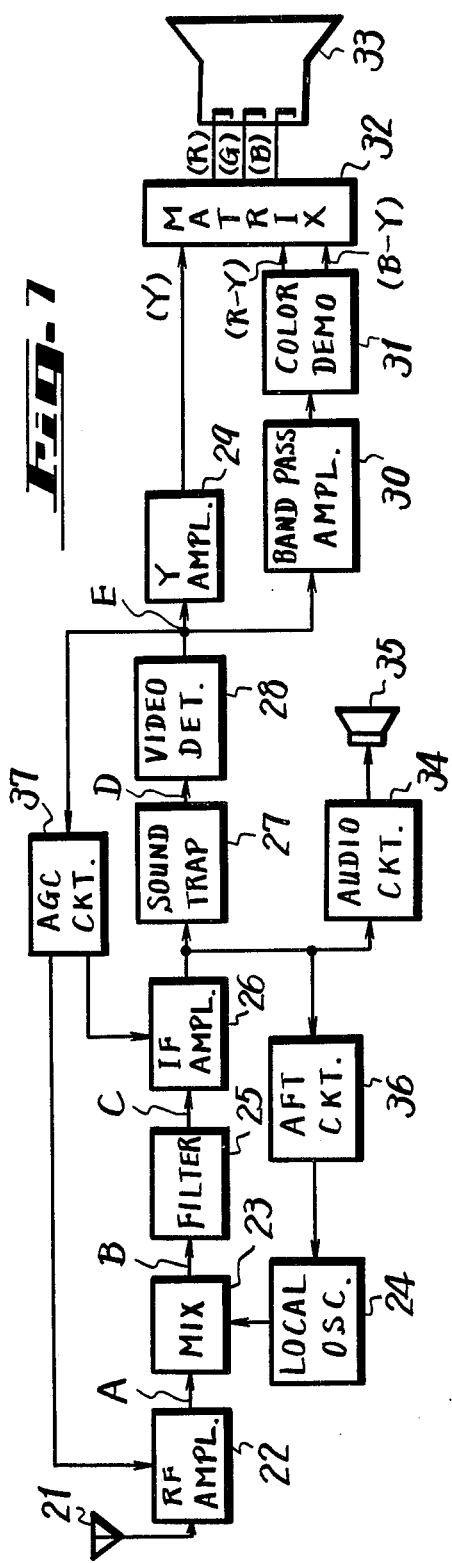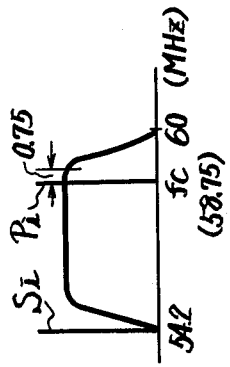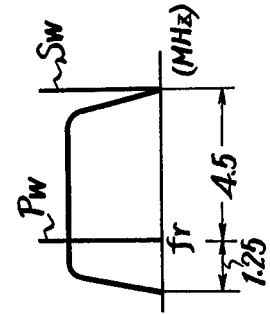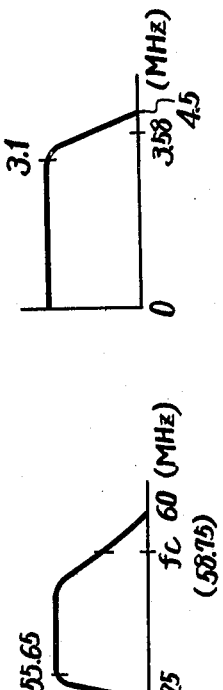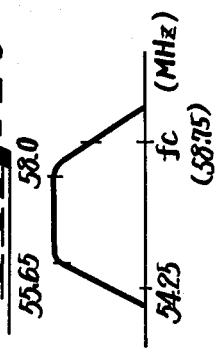

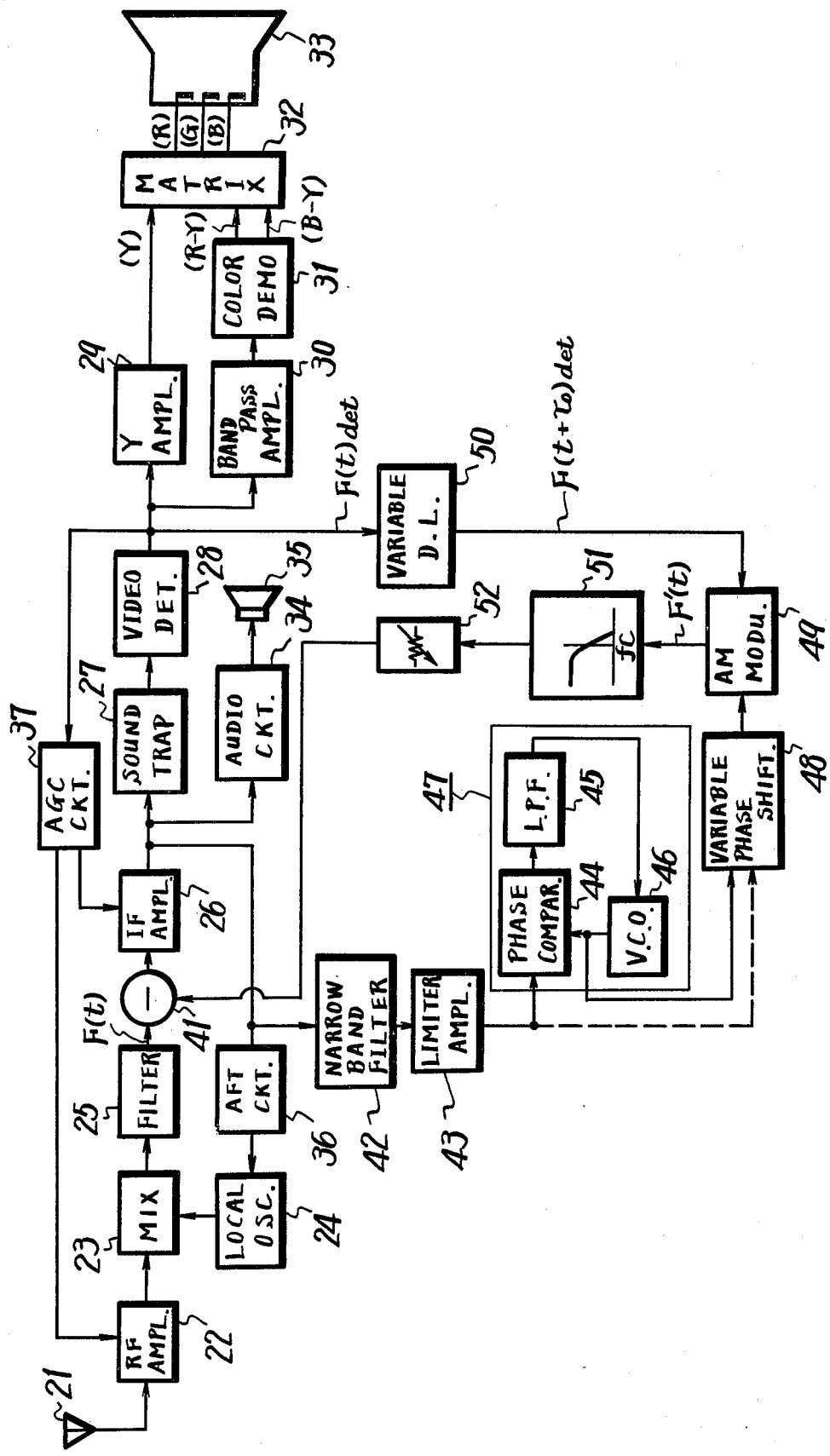

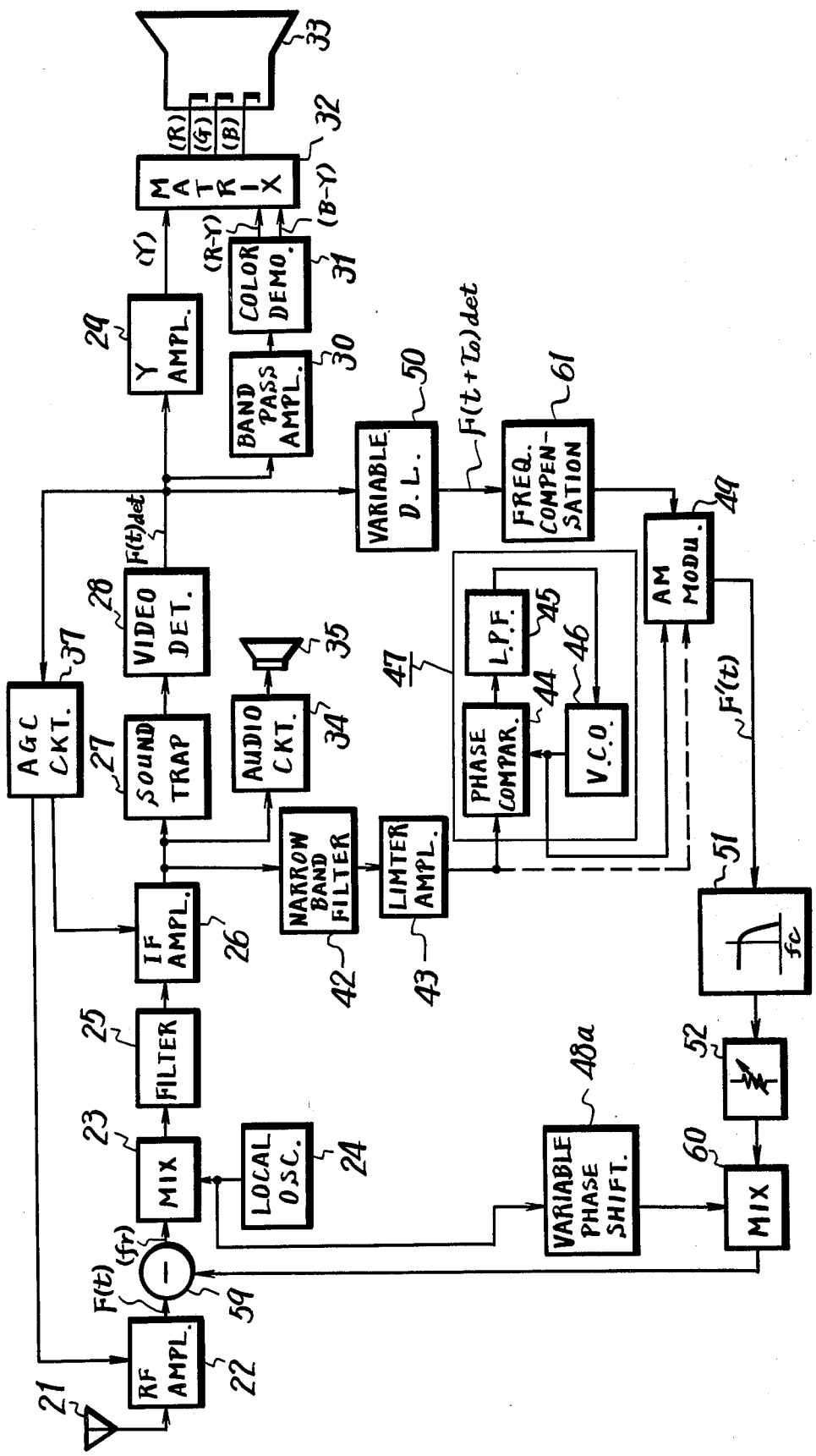

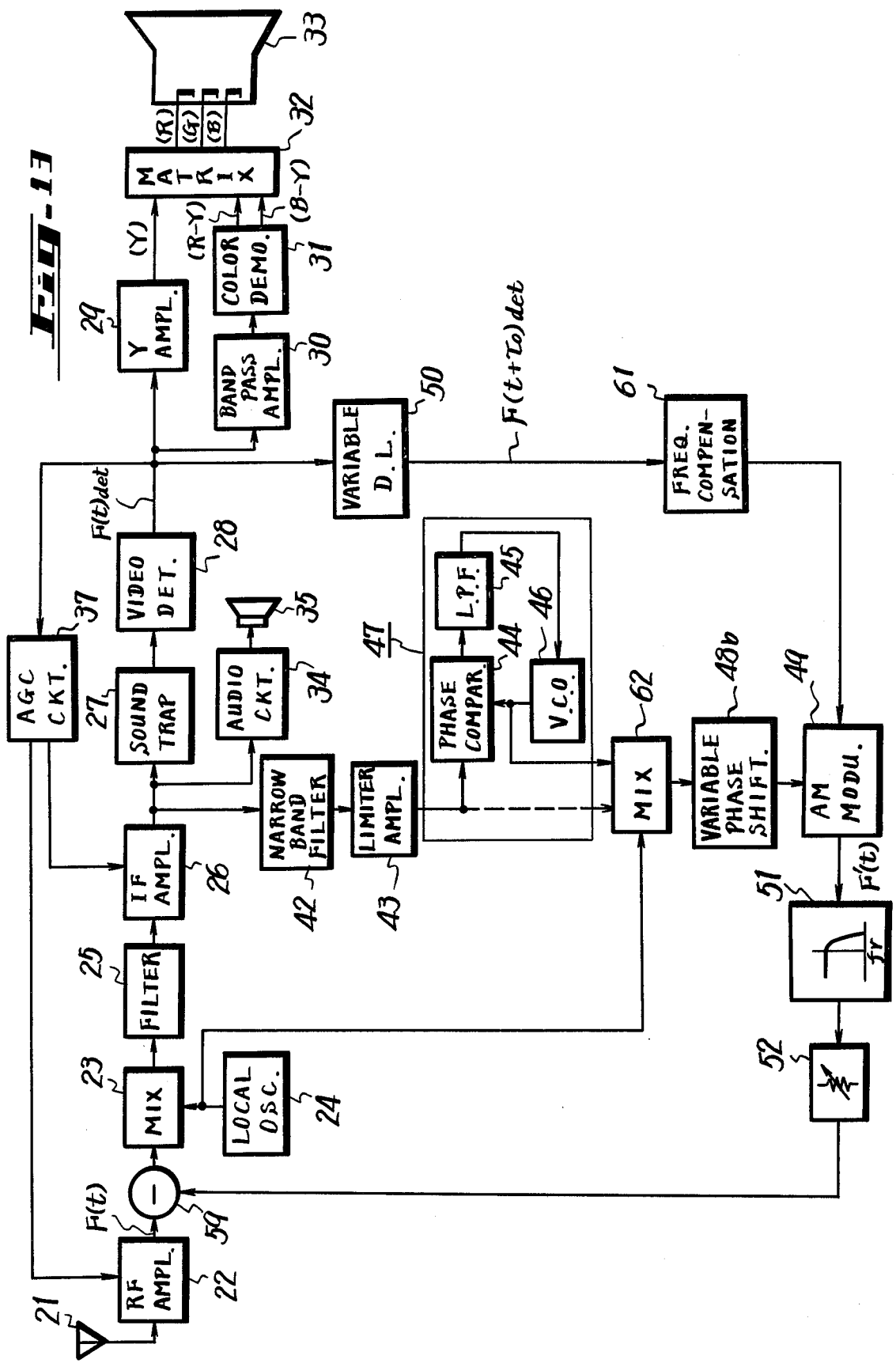

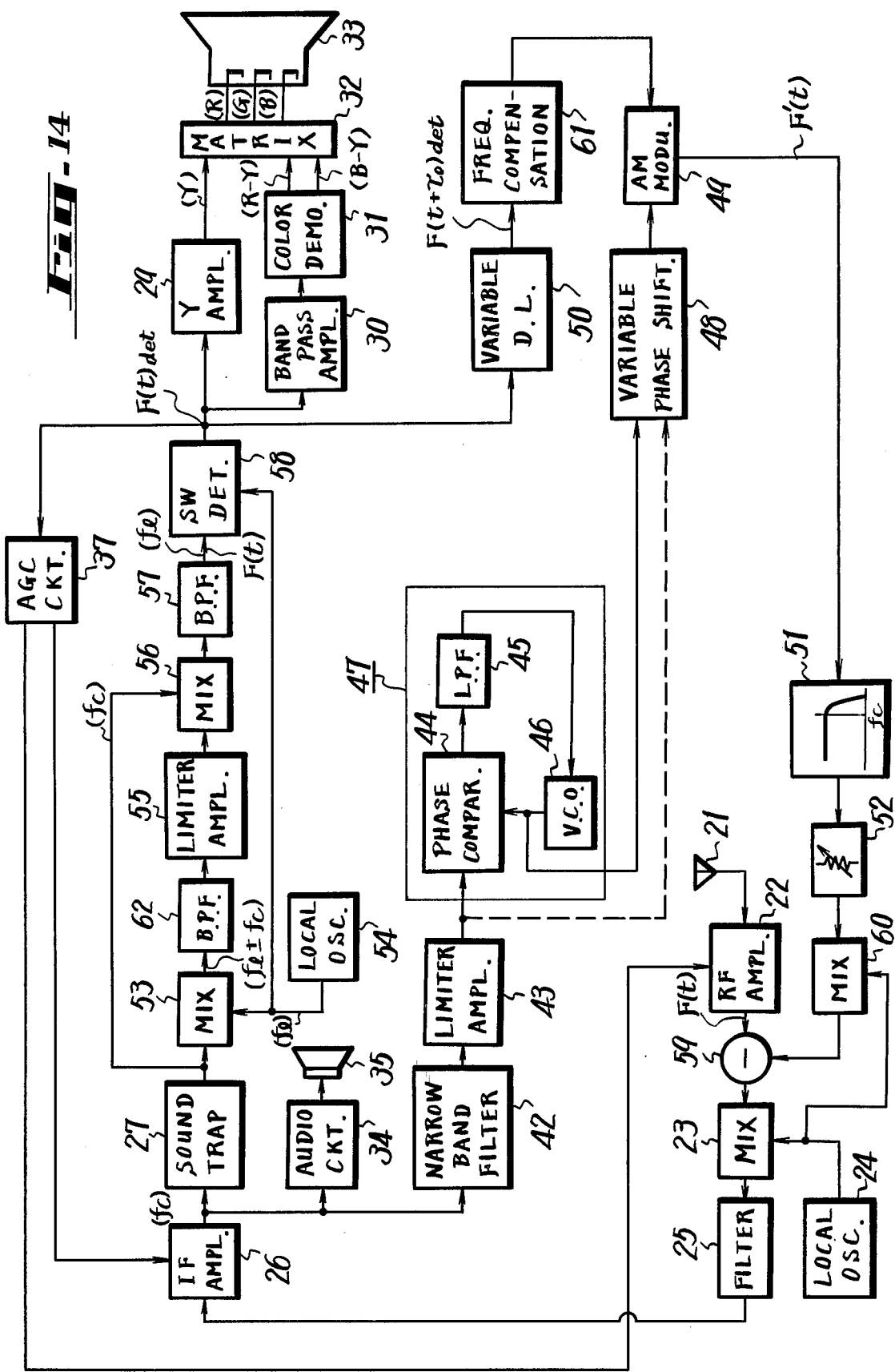

UNDESIRED SIGNAL CANCELLER

BACKGROUND OF THE INVENTION

1. Field of the Invention

This invention relates generally to an undesired signal canceller, and more particularly to a ghost signal canceller for use in a television receiver.

2. Description of the Prior Art

In the art, a television receiver, by way of example, receives not only a broadcasting wave directly from a transmitting antenna but also waves reflected from mountains, buildings and so on, so that the video picture appears to be reproduced on the television receiver with a double or triple image; that is, the so-called ghost image is reproduced.

One example of prior art ghost signal cancellers can best be explained by referring to FIG. 1 of the accompanying drawings. With this prior art ghost signal canceller, the output terminal of a video detector circuit 2, whose input terminal 1 is supplied with an IF(intermediate frequency) signal, is connected with a plurality of variable delay lines $3_1, 3_2, \ldots 3_n$ in parallel with one another. The output signals from the variable delay lines $3_1, 3_2, \ldots 3_n$ are fed through level controllers $4_1, 4_2, \ldots 4_n$ to an adder circuit 5 to be added, respectively. The output video signal from the video detector circuit 2 and the output signal from the adder circuit 5 are both supplied to a subtracter circuit 6 to thereby cancel ghost signals and to obtain only a desired signal at an output terminal 7 of from the substracter circuit 6. The above prior art ghost signal canceller proceeds on the assumption that ghost signals, which are low in level and delayed in phase as compared with a desired signal, are superimposed on the desired signal. However, where the ghost signal is produced by adding high frequency modulated signals (television wave signals) with one another at a receiving antenna, such a ghost signal generally is not merely low in level and delayed in phase as compared with the desired signal. Therefore, the latter ghost signals can not be cancelled or eliminated sufficiently by the prior art ghost signal canceller shown in FIG. 1.

FIGS. 2A to 2E show respectively different waveforms which result from different phase differences between a desired signal and a ghost signal. It is assumed that when a desired signal $S_h$ shown in FIG. 2A is transmitted, a ghost signal $S_g$ appears at a certain receiving point or time. When the desired signal $S_h$ and the ghost signal $S_g$ are received as a composite signal and envelope-detected, the envelopes of the composite signal are respectively shown in FIGS. 2B to 2E due to the phase relation of the carrier signals of the desired and ghost signals $S_h$ and $S_g$. That is, when the phase difference between the desired and ghost-carrier signals is 0°, the desired and ghost signals $S_h$ and $S_g$ are of the same polarity as shown in FIG. 2B, but when the phase difference is 180°, the desired and ghost signals $S_h$ and $S_g$ are of opposite polarity as shown in FIG. 2D. If the phase difference is 0° or 180°, the ghost signal $S_g$ can be eliminated by the prior art ghost signal canceller shown in FIG. 1.

However, when the phase difference is 90° or 270°, the ghost signal $S_g$ appears as the waveform as shown in FIG. 2C or 2E which appears as a differentiated version of the ghost signal $S_g$ when the phase difference is 0° or 180° shown in FIG. 2B and 2D. In such a case, that is, when the phase difference is 90° or 270°, the ghost signal $S_g$ can not be eliminated by the ghost signal canceller shown in FIG. 1.

FIG. 3 shows another prior art ghost signal canceller which differs from that shown in FIG. 1 in that the IF signal is treated in advance of the video detector to carry out ghost signal cancelling before the IF signal is supplied to the video detector 2 (not shown in FIG. 3). The remaining circuit construction of FIG. 3 is substantially the same as that of FIG. 1.

If the signal is treated in the form of an IF signal (FIG. 3) the ghost signal can be eliminated even when the phase difference between the desired signal and ghost signal is other than 0° or 180°. However, in this case the variable delay lines $3_1, 3_2, \ldots 3_n$ are of complex design and are large in size. A solid delay line whose delay time is fixed can not be used as the variable delay lines, but in general a plurality of phase shifters in cascade connection can be used effectively. An example of such variable delay lines is shown in FIG. 4 in which one terminal of a circuit 9a consisting of an inductance and a capacitor, which serves as a phase shifter, is used as an input terminal 10 and its other terminal is used as an output terminal 11a. Another similar circuit 9b, also consisting of a coil and a capacitor, is connected at its input terminal to the output terminal 11a of circuit 9a and its output terminal 11b is connected with the input terminal of a further circuit 9c, also consisting of a coil and a capacitor. Other similar circuits 9d, ... as shown, are connected in cascade and output terminals 11c, 11d, ... are led out therefrom, respectively. In one embodiment, these output terminals 11a, 11b, 11c, ... are used as the fixed contacts of a slide switch 12 from whose movable contact 13 there is connected an output terminal 14. With such variable delay line circuit construction, the effective number of circuits connected between input and output terminals 10 and 14 is determined by the slide switch 12, and the delay time between the input and output terminals can be changed in a step-wise manner.

If the IF ghost signal is delayed by a time of $\tau_o$ with respect to the desired IF signal and the carrier of the ghost signal has the period T as shown in FIG. 5, the number of circuits 9a, 9b, . . . , (FIG. 4) required for eliminating the ghost signal is in proportion to $\tau_o/T$ since circuits 9a, 9b . . . serve as respective phase shifters. In fact, since the frequency of the carrier for the IF signal is high, for example, 58.75 MHz, so that its period T is very short, $\tau_o/T$ becomes large. As a result, the number of phase shifters forming the variable delay lines is increased substantially, resulting in an apparatus of great size. Further, the design of the variable delay lines becomes difficult in view of temperature compensation due to their large size and their accuracy becomes low. For this reason, the prior art ghost signal canceller shown in FIG. 3 does not operate completely satisfactorily to cancel ghost signals.

OBJECTS AND SUMMARY OF THE INVENTION

Accordingly, an object of the present invention is to provide improved apparatus for cancelling undesired signals.

Another object of the invention is to provide apparatus for effectively eliminating ghost signals.

A further object of the invention is to provide a signal delay circuit which is used for eliminating ghost signals and which is of relatively simple construction as compared with prior art signal delay circuits.

According to an aspect of the signal, invention there is provided apparatus for cancelling an undesired signal which apparatus comprises a signal input circuit for receiving an amplitude modulated signal which includes desired and undesired signals, the undesired signals being delayed by a time $\tau_o$ as compared with the desired signal, a signal adder subtracting circuit connected to the signal input circuit, a detector circuit connected to the output of the signal subtracting circuit for demodulating an envelope signal component of an amplitude modulated signal output from the subtracting circuit; a carrier wave former for generating an output signal having a requency corresponding to the carrier frequency of the amplitude modulated signal received by the signal input circuit, a variable delay circuit connected to the detector circuit for delaying the envelope signal therefrom by the time $\tau_o$, an amplitude modulator connected between the carrier wave former and the variable delay circuit for amplitude modulating the carrier wave signal with the delayed envelope signal, a variable phase shifter for shifting the phase of the carrier signal which is amplitude modulated by the delayed envelope signal by an amount corresponding to the time $\tau_o$, a circuit connected to the amplitude modulator for supplying the output signal therefrom to the signal subtracting circuit, the signal subtracting circuit substracting the output signal from the amplitude modulator from the amplitude modulated signal from the input circuit, and a signal output circuit connected to the detector circuit, whereby a demodulated signal, from which the undesired signal is substantially cancelled, is obtained from the signal output circuit.

Other objects, features and advantage of the invention will become apparent from the following description taken in conjunction with the accompanying drawings.

BRIEF DESCRIPTION OF THE DRAWINGS

FIG. 1 is a block diagram shown an example of a prior art circuit for cancelling a ghost signal, as described above;

FIGS. 2A to 2E, inclusive, are waveform diagrams described above in connection with the explanation of a ghost signal;

FIG. 3 is a block diagram showing another example of a prior art circuit for cancelling a ghost signal, as described above;

FIG. 4 is a schematic diagram showing a variable delay line used in a prior art circuit for cancelling a ghost signal, as described above;

FIG. 5 is a waveform diagram described above in connection with explaining the prior art example shown in FIG. 3;

FIG. 7 is a block diagram of a color television receiver with which the invention is applicable;

FIGS. 8A to 8E, inclusive, are graphical representations of the frequency characteristics at respective locations of the system shown in FIG. 7; and FIGS. 9 to 14, inclusive, are block diagrams of embodiments of apparatus for cancelling undesired signals according to the invention.

DESCRIPTION OF THE PREFERRED EMBODIMENTS

Figure 6A:
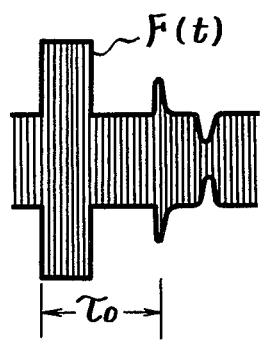
FIGS. 6A to 6H, inclusive, are waveform diagrams which are useful in the explanation of the present invention.
Figure 6B:
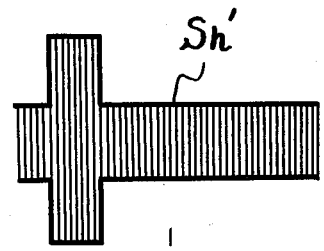
Figure 6C:
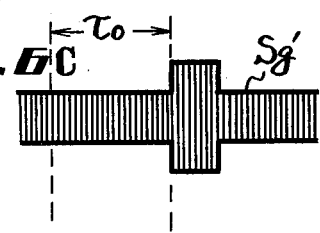

Initially, the theory of the present invention will be described with reference to FIGS. 6A to 6H. It is assumed for the sake of brevity that the IF (intermediate frequencY) signal $F(t)$, has a phase difference between the carrier signals of the desired signal and a ghost signal of 90° and the delay time between the desired and ghost signals is $\tau_o$ as shown in FIG. 6A. This IF signal $F(t)$ can be considered as being composed of a desired signal component $S_h'$ (refer to FIG. 6B) and a ghost signal component $S_g'$ (refer to FIG. 6C). In this case it should be noted that the ghost signal component $S_g'$ is of smaller amplitude than the desired signal component $S_h'$; and the carrier signal of the ghost signal component $S_g'$ can be expressed as $\cos \omega_c(t + \tau_o)$ while the carrier of the desired signal component $S_h'$ can be expressed as $\cos \omega_c t$.

Figure 6D:
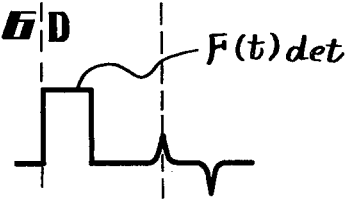
Figure 6E:
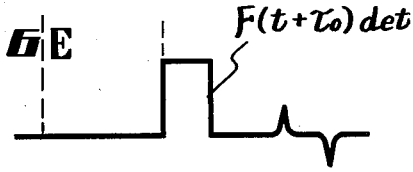
Figure 6F:
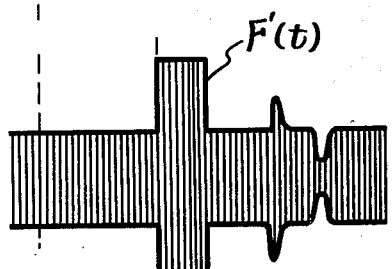

In accordance with the present invention, the IF signal $F(t)$ is amplitude-detected to be derive a detected output signal $F(t)$ det as shown in FIG. 6D, and this signal ($F(t)$ det then is delayed by a time $\tau_o$ to derive a signal $F(t + \tau_o)$ det shown in FIG. 6E. The video carrier $\cos \omega_c t$ is also delayed by the time $\tau_o$ to form carrier signal $\cos \omega_c(t + \tau_o)$. This delayed carrier signal $\cos \omega_c(t + \tau_o)$ is amplitude-modulated with the signal $F(t + \tau_o)$ det to form a signal $F'(t)$ shown in FIG. 6F. After the signal $F'(t)$ is amplitude-adjusted, if the signal $F'(t)$ is subtracted from the original signal $F(t)$, the ghost signal component $S_g'$ will be cancelled, and hence an IF signal, which contains almost no ghost signal component, will be obtained as shown in FIG. 6G.

Figure 6H:
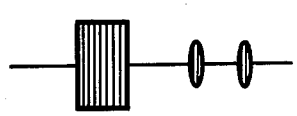
Figure 6G:
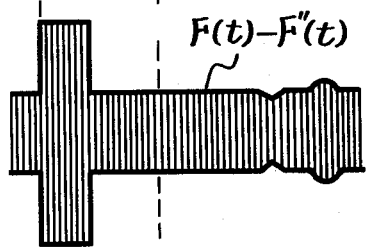

Further in accordance with the invention amplitude modulation of the carrier signal with the signal $F(t + \tau_o)$ det is carried out by a balanced modulator to form a signal in which the carrier component is suppressed as shown in FIG. 6H. This suppressed carrier signal is then subtracted from the original signal $F(t)$. By using a suppressed carrier signal, there is the advantage that no amplitude difference appears between the original signal $F(t)$ and the resultant output signal from which the ghost signal component is eliminated. The teachings of the invention also can be applied to the RF stage for use with the RF (radio frequency) signal and need not be limited to the IF signal.

In accordance with this invention since the signal $F(t)$ det, which is obtained by amplitude-detecting the video IF signal $F(t)$, is delayed by the time $\tau_o$(FIG. 6E), the variable delay line for this purpose can be of simplified construction. A high frequency carrier signal also must be delayed by the time $\tau_o$, but since the carrier signal is of constant amplitude, the delay time $\tau_o$ is substantially equivalent to a predetermined phase shift (within 360°) in one period of the carrier signal. Therefore, there is no need to use multi-stages of variable delay lines (phase shifters), in which many stages of phase shifters are connected in cascade, for delaying the IF signal, as in the prior art. Accordingly, the delay circuit can be simplified and improved in accuracy so as to eliminate the ghost signal component effectively.

Further, with this invention even if the phase difference between the desired and ghost signals is other than 0° or 180°, the ghost signal can be eliminated from the received signal because the received signal is processed as the IF or RF signal.

As mentioned above, the present invention can avoid the defects of prior art apparatus for cancelling ghost signals.

For the purpose of providing a mathematical explanation, a video IF signal $f(t)$, which is transmitted by vestigial side-band transmission and contains no ghost signal component, is expressed by the following formula (1).

$$f(t) = [A(1 + m_1 \cos\omega_{sl} t) \cos\omega_c t]_F + (A/2) m_1 \cos(\omega_c - \omega_{sh})t \quad (1)$$

where $A \cos\omega_c t$ is the carrier signal component of the IF signal;

$m_1$ is the modulation degree;

$f_c$ and $\omega_c$ are the frequency and angular velocity of the IF carrier signal, respectively;

$f_{sl}$ and $\omega_{sl}$ are the frequency and angular velocity of low frequency component of the video signal, respectively;

$f_{sh}$ and $\omega_{sh}$ are the frequency and angular velocity of a high frequency component of the video signal;

$m_1 A \cos\omega_{sl} t$ is the low frequency component of the video signal;

$(A/2) m_1 \cos(\omega_3 - \omega_{sh})t$ is the single side band component of the IF signal; and $[A(1 + m_1 \cos\omega_{sl} t) \cos\omega_c t]_F$ means that the signal $A(1 + m_1 \cos\omega_{sl} t)$ is passed through a VSB (vestigial side-band) filter in which the above signal is reduced in level to 1/2 at the frequency of the IF carrier signal.

If the IF signal expressed by the formula (1) contains ghost signals or one ghost signal (for the sake of convenience of this explanation) which is delayed by the time $\tau_o$ from a desired signal, such a signal can be expressed by the following formula (2).

$$F(t) = [A(1 + m_1 \cos\omega_{sl} t) \cos\omega_c t]_F + (A/2) m_1 \cos(\omega_c - \omega_{sh})t + [B(1 + m_1 \cos\omega_{sl}(t + \tau_o)) \cos\omega_c (t + \tau_o)]_F + (B/2) m_1 \cos(\omega_c - \omega_{sh})(t + \tau_o) \quad (2)$$

where B represents the amplitude of the ghost signal and $B = \alpha A (E < 1)$.

In accordance with this invention the signal $F(t)$ is demodulated by an amplitude detector such as an envelope detector, a switching detector and the like. Thus, a video signal $F(t)$ det is obtained as expressed by the following formula (3).

$$F(t) \text{ det} \approx K_1[(A/2) m_1 \cos\omega_{sl} t \cdot \cos\phi + (A/2) m_1 \cos(\omega_{sh} t + \phi) + (B/2) m_1 \cos\omega_{sl}(t + \tau_o) \cos \omega_c \tau_o - \phi \text{is}) + (B/2) m_1 \cos\{\omega_{sh}(t + \tau_o) + \omega_c \tau_o + \phi\}] \quad (3)$$

where $K_1$ represents the gain of the detector circuit; $\phi$ the detecting phase difference between the carrier signals included in the signals $f(t)$ and $F(t)$ which are expressed by the formulae (1) and (2), respectively; and $\phi = \tan^{-1}$.

$$\frac{B \sin \omega_c \tau_o}{A + B \cos \omega_c \tau_o}.$$

Since the detecting phase difference $\phi$ is nearly zero when the amplitude of the ghost signal is small for relative to main signal, it is assumed that $\phi = 0$ for the convenience of this explanation. Thus, the formula (3) can be rewritten as follows:

$$F(t) \text{ det} \approx K_1[(A/2) m_1 \cos\omega_{sl} t + (A/2) m_1 \cos\omega_{sh} t + (B/2) m_1 \cos\omega_{sl}(t + \tau_o) \cos\omega_c \tau_o + (B/2) m_1 \cos\{\omega_{sh}(t + \tau_o) + \omega_c \tau_o\}] \approx K_1[(A/2) m_1 \cos\omega_{sl} t + (A/2) m_1 \cos\omega_{sh} t + (B/2) m_1 K_2 \cos\omega_{sl}(t + \tau_o) + (B/2) m_1 K_2 \cos\omega_{sh}(t + \tau_o) - (B/2) m_1 \sin\theta \sin\omega_{sh}(t + \tau_o)] \quad (4)$$

where $\theta = \omega_c \tau_o$ and $K_2 = \cos\theta$.

In the formula (4), the terms with ($K_1 B/2$) are the ghost components; but the ghost signal components include the term $[-(B/2) m_1 \sin\theta \sin\omega_{sh}(t + \tau_o)]$, so that theoretically the ghost signal components can not be cancelled easily from the video detector output signal.

By this invention, the signal $(F(t + \tau_o)$ det is provided by delaying the video signal $F(t)$ det by the time $\tau_o$, which is expressed as follows.

$$F(t + \tau_o) \text{ det} \approx K_1[(A/2) m_1 \cos\omega_{sl}(t + \tau_o) + (A/2) m_1 \cos\omega_{sh}(t + \tau_o) + (B/2) m_1 K_1 \cos\omega_{sl}(t + 2\tau_o) + (B2) m_1 K_2 \cos\omega_{sh}(t + 2\tau_o) - (B2) m_1 \sin\theta \sin\omega_{sh}(t + 2\tau_o)] \quad (5)$$

In the formula (5), the main signal component $K_1[A/2 m_1 \cos\omega_{sl}(t + \tau_o) + A/2 m_1 \cos\omega_{sh}(t + \tau_o)]$ is correlated to the ghost signal component in the IF signal which is expressed by the formula (2).

It is considered that the carrier signal $A' \cos\omega_c(t + \tau_o)$ is amplitude-modulated with the signal $F(t + \tau_o)$ det, a signal $F'(t)$ expressed by the following formula (6) is obtained.

$$F'(t) = A' \{1 + \frac{1}{A'} F(t + \tau_o) \text{ det}\} \cos \omega_c(t + \tau_o) \doteq \quad (6)$$

$$A' \{1 + \frac{A}{2A'} K_1 m_1 \cos \omega_{sl}(t + \tau_o) +$$

$$\frac{A}{2A'} K_1 m_1 \cos \omega_{sh}(t + \tau_o) + \frac{B}{2A'} K_1 m_1 K_2 \cos \omega_{sl}(t + 2\tau_o) +$$

$$\frac{B}{2A'} K_1 m_1 \cos \omega_{sh}(t + 2\tau_o) -$$

$$\frac{B}{2A'} K_1 m_1 \sin \theta \sin \omega_{sh}(t + 2\tau_o)\} \cos \omega_c(t + \tau_o)$$

When the signal $F'(t)$ expressed by the formula (6) is passed through a VSB (vestigial side-band) filter, which has such characteristics that the amplitude of the signal fed thereto is reduced by 1/2 at the frequency of the carrier signal, to be amplitude-adjusted 1 (or multiplied by $K_3$), a signal $K_3 F''(t)$ is obtained which is expressed as follows.

$$K_3 F'(t) = [A' K_3 \cos\omega_c(t + \tau_o)]_F + [(A/2) K_1 K_3 m_1 \cos\omega_{sl}(t + \tau_o) \cos\omega_c(t + \tau_o)]_F + [(B/2) K_1 K_2 K_3 m_1 \cos\omega_{sl}(t + 2\tau_o) \cos\omega_c(t + \tau_o)]_F + (A/4) K_1 K_3 m_1 \cos(\omega_c - \omega_{sh})(t + \tau_o) + (B/4) K_1 K_2 K_3 m_1 \cos\{\omega_c(t + \tau_o) - \omega_{sh}(t + 2\tau_o)\} + (B/4) K_1 K_3 m_1 \sin\theta \sin\{\omega_c(t + \tau_o) - \omega_{sh}(t + 2\tau_o)\} \quad (7)$$

The value of $K_3$ is selected to satisfy $B m_1 = (A/2) K_1 K_3 m_1$ or $K_3 = (2B/AK_1)$ in the formulae (2) and (7). Thus, the following expressions are established.

$$A' K_3 = \frac{2A'B}{AK_1}$$

$$\frac{B}{2} K_1 K_2 K_3 m_1 = \frac{B^2}{A} K_2 m_1$$

$$\frac{A}{4} K_1 K_3 m_1 = \frac{1}{2} b m_1$$

-continued $$\frac{B}{4} K_1 K_2 K_3 m_1 = \frac{B^2}{2A} K_2 m_1$$

$$\frac{B}{4} K_1 K_3 m_1 = \frac{B^2}{2A} m_1$$

Therefore, the formula (7) can be rewritten as follows.

$$K_3 F''(t) = \left[ \frac{2A'B}{AK_1} \cos \omega_c (t + \tau_o) \right]_F + \tag{8}$$

$$\left[ Bm_1 \cos \omega_{se}(t + \tau_o) \cos \omega_c (t + \tau_o) \right]_F +$$

$$\left[ \frac{B^2}{A} K_2 m_1 \cos \omega_{sl}(t + 2\tau_o) \cos \omega_c (t + \tau_o) \right]_F +$$

$$\frac{1}{2} Bm_1 \cos (\omega_c - \omega_{sh})(t + \tau_o) +$$

$$\frac{B^2}{2A} K_2 m_1 \cos \left\{ \omega_c (t + \tau_o) - \omega_{sh}(t + 2\tau_o) \right\} +$$

$$\frac{B^2}{2A} m_1 \sin \theta \sin \left\{ \omega_c (t + \tau_o) - \omega_{sh}(t + 2\tau_o) \right\}$$

Since the factor of the third term of the formula (8) is $(B^2/A) K_2 m_1 = (\alpha A)^2/A K_2 m_1 = \alpha^2 K_2 m_1 A$ and is sufficiently small as compared with the factor A ($\alpha < 1$, $K_2 < 1$, $m_1 < 1$), the third term can be neglected.

Similarly, the fifth and sixth terms of the formula (8) are sufficiently small as compared with the factor A, so that these terms also can be neglected. As a result, the signal $K_3 F''(t)$ can be expressed as follows.

$$K_3 F''(t) \doteq \left[ \frac{2A'B}{AK_1} \cos \omega_c (t + \tau_o) \right]_F + \tag{9}$$

$$\left[ B_1 m_1 \cos \omega_{sl}(t + \tau_o) \cos \omega_c (t + \tau_o) \right]_F +$$

$$\frac{B}{2} m_1 \cos (\omega_c - \omega_{sh})(t + \tau_o)$$

If the signal expressed by the formula (9) is subtracted from the original modulated signal F(t) expressed by the formula (2), the following formula (10) is obtained.

$$F(t) - _{K3} F''(t) = \left[ A(1 + m_1 \cos \omega_s t) \cos \omega_c t \right]_F + \tag{10}$$

$$\frac{A}{2} m_1 \cos(\omega_c - \omega_{sh})t + \left[ (B - \frac{2A'B}{AK_1}) \cos \omega_c (t + \tau_o) \right]_F$$

Since the third term of the formula (10) is the carrier signal component, if the signal expressed by the formula (10) is detected, a signal expressed by the following formula (11) is obtained.

$$\{F(t) - K_3 F''(t)\} \det \doteq \frac{\beta K_1 m_1 A}{2} (\cos \omega_s t + \cos \omega_{sh} t) = \tag{11}$$

$$\frac{\beta K_1 m_1 A}{2} \cos \omega_s t$$

where $\cos \omega_s t = \cos \omega_{sl} t + \cos \omega_{sh} t$, and $\beta$ is a constant which is a function of the third term of the formula (10).

This formula (11) represents that a video signal, from which the ghost signal components are eleminated, is detected.

If suitable values are selected to satisfy $(2A'/AK_1) = 1$, the third term in the formula (10) becomes zero and hence $\beta = 1$ in the formula (11).

Before describing embodiments of the present invention which carry out the above mentioned mathematical explanation of the invention, a color television receiver system to which the present invention is applicable will be described with reference to FIG. 7, and FIGS. 8A to 8E which are graphical representations of the frequency characteristics at respective locations of FIG. 7.

In FIG. 7, 21 designates an antenna; 22 an RF amplifier connected to the antenna 21; 23 a mixer circuit connected to the RF amplifier 22; 24 a local oscillator connected to the mixer 23 to supply a signal to the latter; 25 a filter connected to the mixer 23; 26 an IF amplifier cnnected to the filter 25; 27 a sound trap connected to the IF amplifier 26; 28 a video detector connected to the sound trap 27; 29 a luminance signal amplifier connected to the video detector 28; 30 a band pass amplifier connected to the video detector 28; 31 a color demodulator circuit connected to the band pass filter 30; 32 a matrix circuit connected to the color demodulator circuit 31 and the luminance signal amplifier 29, respectively; and 33 a color cathode ray tube, respectively. An audio circuit 34 is connected to the output side of the IF amplifier 26 and a speaker 35 is connected to the output side of the audio circuit 34. The IF signal from the IF amplifier 26 is supplied also to an AFT (automatic fine tuning) circuit 36 which supplies its output signal to the local oscillator 24 to control the latter. The output signal from the video detector 28 is fed further to an AGC (automatic gain control) circuit 37 which supplies its AGC voltage to the RF amplifier 22 and the IF amplifier 26, respectively.

The frequency characteristic of the output signal from the RF amplifier 22 (at a point A) is shown in FIG. 8A. In FIG. 8A, $P_w$ represents the video RF carrier signal and $S_w$ the sound RF carrier signal, respectively. The frequency characteristic of the output signal from the mixer 23 (at a point B) is shown in FIG. 8B in which Si represents the sound IF carrier signal and Pi the video IF carrier signal, respectively. The frequency characteristic of the output signal from the filter 25 (at a point C) is shown in FIG. 8C, that of the output signal from the sound trap 27 (at a point D) is shown in FIG. 8D in which the sound IF carrier signal is attenuated, and that of the output signal from the video detector 28 (at a point E) is shown in FIG. 8E, respectively.

FIG. 9 shows one example of a color television receiver in which the present invention is employed. In FIG. 9 the same reference numerals are used as in FIG. 7 to designate the same compounds.

In the example of FIG. 9, a subtracter circuit 41 is provided between the filter 25 and the IF amplifier 26 to cancel or eliminate a ghost signal from the video IF carrier signal. In the figure, 42 indicates a narrow band filter whose center frequency is equal to that of the video IF carrier signal (58.75MHz) and which is supplied with the IF signal from the IF amplifier 26. The output signal from the narrow band filter 42 is fed through a limiter amplifier 43 to a phase comparator 44. The output signal from the phase comparator 44 is fed to a low pass filter 45 whose output signal is fed to a voltage controlled oscillator 46, and the output signal therefrom is fed to the phase comparator 44. In this case, the phase comparator 44, low pass filter 45 and voltage controlled oscillator 46 form a PLL (phase locked loop) circuit 47. The carrier signal from the voltage controlled oscillator of the PLL circuit 47 is supplied to a variable phase shifter 48 which shifts the phase of the carrier signal by the substantial phase-shifting amount $(\omega_c \tau_o - 2n\pi)$ corresponding to $\theta(=\omega_c \tau_o)$ of equation (4). For the purpose of producing the carrier signal, the PLL circuit 47 may be omitted and the output signal from the limiter amplifier 43 can be fed directly to the variable phase shifter 48 as shown by a dotted line in FIG. 9. In either event, the carrier signal thus produced is supplied through the variable phase shifter 48 to an amplitude modulator circuit 49 which is also supplied through a vairable delay line 50 with the video signal from the video detector 28 as a modulating signal. The delay time of the variable delay line 50 is selected as $\tau_o$. In the example shown in FIG. 9, it is assumed that only one ghost signal is present, so that only a single variable phase shifter 48 and a single variable delay line 50, respectively are provided. However, where two or more ghost signals are present, a plurality of variable phase shifters and variable delay lines, respectively, are provided. The output modulated signal from the amplitude modulator circuit 49 is fed to the subtracter circuit 41 through a VSB (vestigial sideband) filter 51 and a level controller 52. Thus, the signal, from which a ghost signal has been cancelled, is obtained from the subtracter circuit 41.

In FIG. 9, references $F(t)$, $F(t)$ det, $F(t + \tau_o)$ det and $F(t')$ correspond to the signals shown in FIGS. 6A and 6D to 6F, respectively, and show the points where they are produced.

Figure 10:
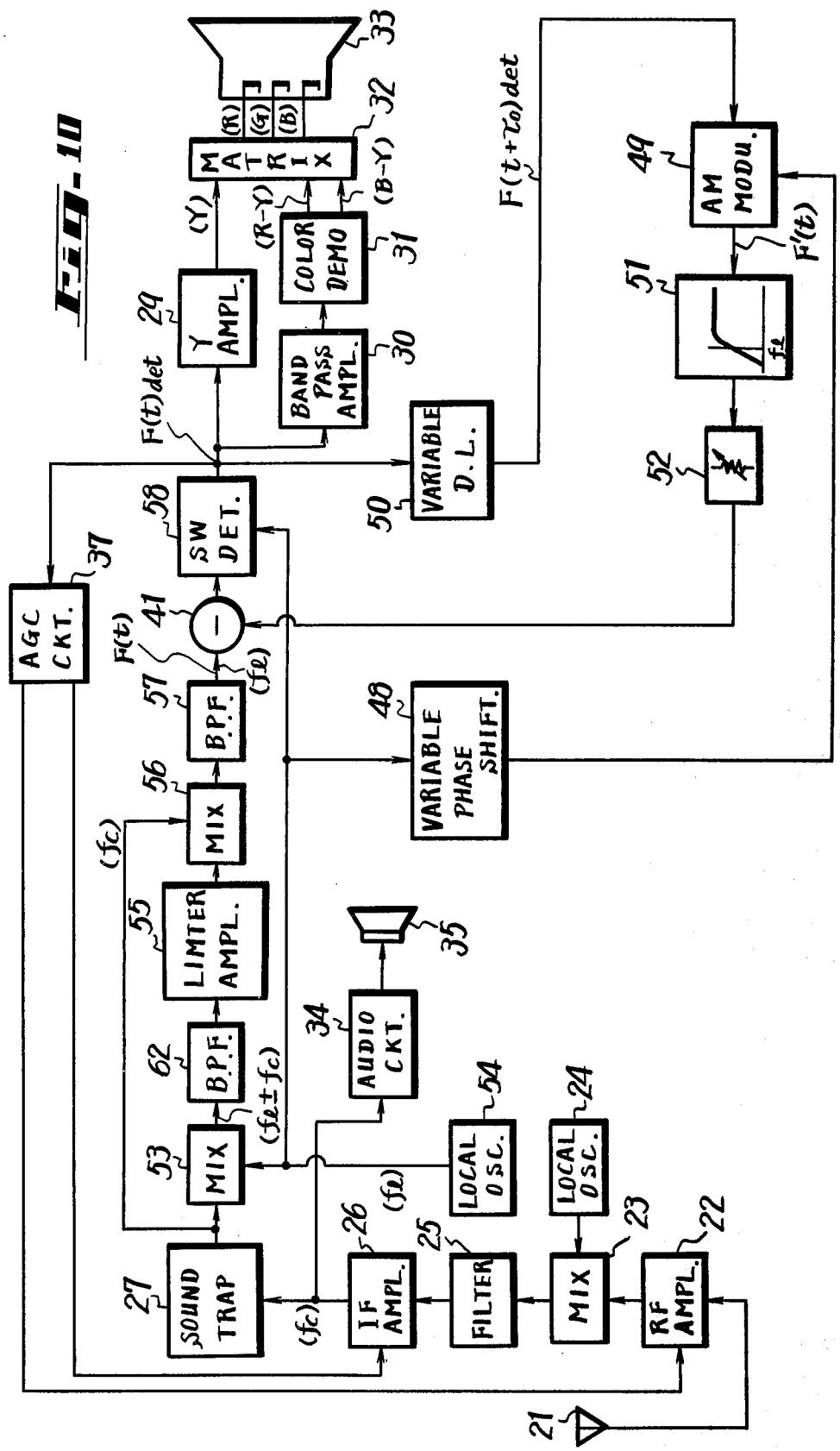

FIG. 10 shows another example of the invention in which the signal which is treated is the video IF signal. The reference numerals used in FIG. 10 are the same as those used in FIGS. 7 and 9 to represent the same components. The difference between the examples of FIGS. 10 and 9 is that in the example of FIG. 10 the IF carrier signal is fed to a switching detector to demodulate the video signal. To achieve switching detection, the IF carrier signal (its carrier frequency is $f_c$) is frequency-converted.

In the example of FIG. 10, a mixer circuit 53 is connected to the output side of the sound trap 27, and a local oscillator circuit 54 is provided which produces an oscillation signal of the frequency $f_l$ and supplies the same to the mixer circuit 53. Thus, the mixer 53 produces a signal whose carrier frequency is $(f_l \pm f_c)$ at its output terminal. The output signal from the mixer 53 is supplied to a band pass filter 62 and a limiter amplifier 55 so as to exhibit constant amplitude and then is supplied to another mixer circuit 56 which is also supplied with the output signal from the sound trap 27. The output signal from the mixer circuit 56 is passed through a band pass filter 57. Thus, the IF carrier signal is converted from the frequency $f_c$ to the frequency $f_i$ and then is supplied to the subtracter circuit 41.

The signal for eliminating the ghost signal is produced by the amplitude modulator circuit 49 which is supplied with the output signal from the local oscillator 54 through the variable phase shifter 48 as a carrier signal. The output signal from the amplitude modulator 49 is supplied through the VSB filter 51 and the level controller 52 to the subtracter circuit 41. Since the IF frequency is converted to $f_i$ by the mixer circuit 56, the frequency characteristic of the VSB filter 51 is selected such that the output level is reduced by 6 dB at the frequency $f_i$. Thus, the signal from which the ghost signal is cancelled can be obtained from the subtracter circuit 41 and then is fed to a switching detector circuit 58 such as a double balance type. The output signal from the local oscillator 54 is supplied also to the switching detector circuit 58 as a reference carrier signal, so that video signal (containing the chrominance signal) can be obtained from the switching detector circuit 58.

References $F(t)$, $F(t)$ det, $F(t + \tau_o)$ det and $F'(t)$ shown in FIG. 10 correspond to the signals shown in FIGS. 6A and 6D to 6F, respectively, and show the points where there are produced.

With the examples of the invention shown in FIGS. 9 and 10, the ghost signal is eliminated at the IF signal stage. In further examples of the invention, the ghost signal is eliminated at the RF signal stage as will be described with reference to FIGS. 11 to 14, respectively, in which the same reference numerals are used as in FIGS. 9 and 10 to designate the same components.

Figure 11:
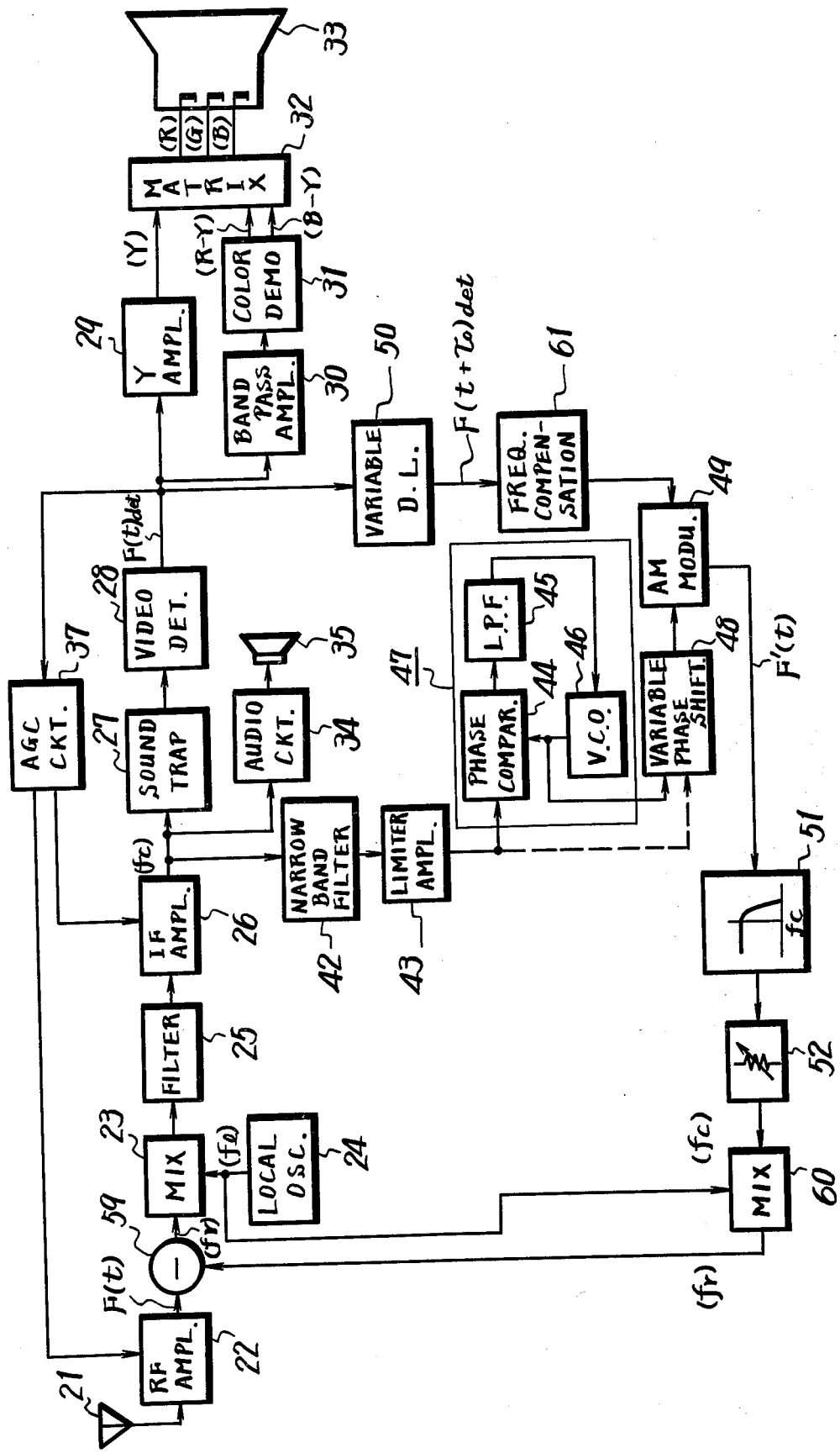

In FIG. 11, 59 designates a subtracter circuit provided between the RF amplifier 22 and the mixer circuit 23. This subtracter circuit 59 serves to carry out a subtracting operation for the RF signal of a carrier frequency $f_r$ for every receiving channel. The subtracter circuit 59 is also supplied with the output signal from a mixer circuit 60, the mixer being supplied through the VSB filter 51 and level controller 52 with the output signal from the amplitude modulator 49. The output signal from this amplitude modulator 49 is an amplitude modulated signal having a carrier signal with the frequency of $f_c$ formed in a manner similar to that described with respect to the example of FIG. 9. However, the amplitude modulator 49 (in FIG. 11) is supplied with the output signal of the variable delay line 50 through a frequency compensation circuit 61.

As may be apparent from a comparison of FIG. 8A with FIG. 8E, in the output signal from the video detector 28 the signal level near the subcarrier signal frequency of 3.58 MHz is suppressed as compared with the signal level of the output signal from the RF amplifier 22 at the corresponding frequency, that is, both the signal levels are not correspondent or equal with each other. For this reason, the frequency compensation circuit 61 has such a characteristic as to emphasize the signal component near the frequency of the sub-carrier signal (3.58 MHz) so as to equalize these signal levels. Further, the filter 51 has a characteristic such that the signal level is not attenuated at the video IF frequency(as shown in block 51), because the frequency characteristic at the RF stage does not attenuate the video signal corresponding to the sub-carrier frequency, as shown in FIG. 8A. Thus, a subtraction is obtained wiith proper signal levels. The output signal of the local oscillator 24 is supplied to the mixer circuit 60, so that the output signal from the amplitude modulator 49 (which is of the IF signal frequency) is converted into the video RF signal frequency corresponding to the frequency of received channel by the mixer circuit 60 and then is fed to the subtracter circuit 59. Thus, a video RF signal from which the ghost signal is cancelled is derived from the subtracter circuit 59.

In FIGS. 11 to 14, the signals corresponding to those shown in FIG. 6A and 6D to 6F are shown at corresponding points, and the carrier signal supplied to the amplitude modulator 49 is produced by the PLL circuit 47. In an alternative embodiment, possible that the output signal from the limiter amplifier 43 is directly fed to the variable phase shifter 48 as shown by a dotted line and as described in connection with FIG. 9.

In the embodiment of the invention shown in FIG. 12, a variable phase shifter 48a corresponding to the variable phase shifter 48 in FIG. 11 is connected between the mixer circuit 60 and the local oscillator circuit 24 so as to shift the phase of the local oscillating signal fed to the mixer circuit 60. The remaining circuit construction of FIG. 12 is substantially the same as that of FIG. 11, so that its description will be omitted in the interest of brevity.

The example of the invention shown in FIG. 13 differs from the embodiment of FIG. 11 in that the reference carrier signal from the PLL circuit 47 is supplied to a mixer circuit 62 which is also supplied with the oscillation signal from the local oscillator circuit 24. Thus, the mixer circuit 62 produces a reference carrier signal whose frequency is the video RF signal frequency $f_r$. This reference carrier signal is fed through a variable phase shifter 48b to the amplitude modulator 49. Alternatively, the variable phase shifter 48b can be connected between the local oscillator circuit 24 and the mixer circuit 62 or between the mixer circuit 62 and the PLL circuit 47 instead of in the position shown in FIG. 13. The output signal from the amplitude modulator 49 is supplied through the filter 51 and the level controller 52 to the subtracter 59. Since the filter 51 here is inserted into the RF signal path, its frequency characteristic (i.e., the frequency at which its negative slope begins) is changed over in ganged relation to the shift of the frequency $f$ upon channel selection.

In the examples of FIGS. 11 to 13, the video detector 28 is an envelope detector, but it is, of corse, recognized that a switching detector can be used. In the example of the invention shown in FIG. 14, the switching detector 58 shown in FIG. 10 is used in place of the envelope detector 28 shown in FIG. 11. Since the operation of switching detector 58 is substantially the same as that shown in FIG. 10, its description will be omitted.

If the amplitude modulator circuit 49 used in all of the described embodiments of the invention is selected to be a balanced modulator type, the amplitude of the corrected carrier wave signal formed of the composite subtracted signals (F(t) - F''(t)) does not fluctuate as relative to the rceived signal F(t). Thus, the operation of the AGC circuit 37 is prevented from being unstable.

Further, in the described examples of the invention, the level controller 52, whichis coupled to the output of the amplitude modulator 49, may, in turn, be coupled to the output of the video detector 28 or switching detector 58, so that the frequency of the signal to be level-controlled is relatively low, thereby simplifying the level control operation.

It will be apparent that many modifications and variations could be effected by one skilled in the art without departing from the spirit or scope of the novel concepts of the invention, so that the scope of the invention should be determined solely by the appended claims.

We claim as our invention:

1. Apparatus for cancelling an accompanying undesired signal from a desired signal comprising:

(a) signal input means for receiving an amplitude modulated signal which includes desired and undesired signals, the undesired signal being delayed by a time $\tau_o$ as compared with the desired signal;

(b) subtracting means connected to said signal input means;

(c) detector means connected to said subtracting means for demodulating an envelope signal component from the amplitude modulated signal output of said subtracting means;

(d) carrier wave generating means for generating an output carrier signal having a frequency corresponding to the frequency of the carrier of said amplitude modulated signal received by said signal input means;

(e) variable delay means connected to said detector means for delaying the envelope signal therefrom by the time $\tau_o$;

(f) amplitude modulator means connected between said carrier wave generating means and said variable delay means for amplitude modulating the generated output carrier signal with the delayed envelope signal;

(g) variable phase shifting means for shifting the phase of the signal derived from said amplitude modulator means by an amount corresponding to the time $\tau_o$;

(h) means for supplying the signal derived from said amplitude modulator means to said subtracting means for subtracting the signal derived from said amplitude modulator means from the amplitude modulated signal received by said signal input means; and (i) signal output means connected to said detector means for providing a demodulated signal from which said undesired signal is substantially cancelled.

2. The apparatus of claim 1, wherein said carrier wave generating means is connected to said subtracting means for deriving a carrier signal component from the output of said subtracting means; and said variable phase shifting means is connected between said carrier wave generating means and said amplitude modulator means.

3. The apparatus of claim 1, wherein said amplitude modulated signal received by said signal input means is an intermediate frequency signal of a superheterodyne receiver.

4. The apparatus of claim 1, wherein said amplitude modulated signal received by said signal input means is a radio frequency signal of a superheterodyne receiver.

5. Apparatus for cancelling a ghost signal in a television receiver comprising:

(a) signal input means including at least a radio frequency stage and a mixer stage for deriving an intermediate frequency signal which includes a desired signal and a ghost signal, the ghost signal being delayed by a time $\tau_o$ as compared with the desired signal;

(b) subtracting means connected to said signal input means;

(c) a detector connected to said subtracting means for demodulating an envelope signal component of the intermediate frequency signal output from said subtracting means;

(d) carrier wave generating means for generating a local carrier having an intermediate frequency corresponding to the carrier frequency of the output intermediate frequency signal derived from said signal input means;

(e) variable delay means connected to said detector for delaying the envelope signal therefrom by the time $\tau_o$;

(f) amplitude modulator means connected between said carrier wave generating means and said variable delay means for amplitude modulating the local carrier with the delayed envelope signal;

(g) variable phase shift means for shifting the phase of the carrier component of the modulated signal produced by said amplitude modulator means by an amount corresponding to the time $\tau_o$;

(h) means for supplying an output signal derived from said amplitude modulator means to said subtracting means wherein the output signal derived from said amplitude modulator means is subtracted from the intermediate frequency signal derived from said signal input means; and (i) a video signal output circuit connected to said detector for receiving a video signal from which said ghost signal is substantially cancelled.

6. The apparatus of claim 5, wherein said carrier wave generating means is connected to said subtracting means for deriving an intermediate frequency carrier component from the output signal of said subtracting means; and said variable phase shift means is connected between said carrier wave generating means and said amplitude modulator means.

7. The apparatus of claim 6, wherein said carrier wave generating means includes a narrow band filter which passes only a frequency near the intermediate carrier frequency of the intermediate frequency signal derived from said mixer stage.

8. Apparatus for cancelling a ghost signal in a television receiver comprising:

(a) signal input means including at least a radio frequency stage and a mixer stage for deriving an intermediate frequency signal which includes a desired signal and a ghost signal, the ghost signal being delayed by a time $\tau_o$ as compared with the desired signal;

(b) a frequency converter including a second mixer and a local oscillator and connected to said signal input means for converting the intermediate frequency signal from said signal input means to a second intermediate frequency signal, the carrier frequency of said second intermediate frequency signal being equal to the frequency of said local oscillator;

(c) subtracting means connected to said frequency converter for receiving said second intermediate frequency signal;

(d) a switching detector connected to said subtracting means and to said local oscillator for demodulating an envelope signal component of the second intermediate frequency signal output from said subtracting means;

(e) phase shift means connected to said local oscillator for shifting the phase of the output signal therefrom by an amount corresponding to said time $\tau_o$;

(f) variable delay means connected to said switching detector for delaying the envelope signal therefrom by the time $\tau_o$;

(g) amplitude modulator means connected between said variable phase shift means and said variable delay means for amplitude modulating the phase shifted local oscillator output signal with the delayed envelope signal;

(h) means connected to said amplitude modulator means for supplying an amplitude modulated output signal therefrom to said subtracting means wherein the output signal from said amplitude modulator means is subtracted from said second intermediate frequency signal; and (i) a video signal output circuit connected to said switching detector for receiving a video signal from which said ghost signal is substantially cancelled.

9. Apparatus for cancelling a ghost signal in a television receiver comprising:

(a) signal input means including a radio frequency stage for deriving a radio frequency signal which includes a desired signal and a ghost signal, the ghost signal being delayed by a time $\tau_o$ as compared with the desired signal;

(b) subtracting means connected to said signal input means;

(c) a first mixer connected to said subtracting means;

(d) a local oscillator connected to said first mixer;

(e) an intermediate frequency stage connected to said first mixer;

(f) a detector connected to said intermediate frequency stage for demodulating an envelope signal component of the intermediate frequency signal produced by said intermediate frequency stage;

(g) carrier wave forming means for deriving an output signal having an intermediate frequency corresponding to a carrier frequency of the output signal produced by said intermediate frequency stage;

(h) variable delay means connected to said detector for delaying the envelope signal therefrom by the time $\tau_o$;

(i) an amplitude modulator connected between said carrier wave forming means and said variable delay means for amplitude modulating the output signal derived by said carrier wave forming means with the delayed envelope signal;

(j) a second mixer connected between said amplitude modulator and said local oscillator for converting the frequency of the amlitude modulated output signal from said amplitude modulator to a radio frequency;

(k) variable phase shift means for shifting the phase of the frequency converted amplitude modulated output from said second mixer by an amount corresponding to the time $\tau_o$;

(l) means connected to said second mixer for supplying the output signal therefrom to said subtracting means for subtracting the output signal from said second mixer from said derived radio frequency signal; and (m) a video signal output circuit connected to said detector for producing a video signal from which said ghost signal is substantially cancelled.

10. The apparatus of claim 9, wherein said variable phase shift means is inserted between said carrier wave forming means and said amplitude modulator.

11. The apparatus of claim 9, wherein said variable phase shift means is inserted between said local oscillator and said second mixer.

12. The apparatus of claim 9, wherein said detector comprises:

(a) a frequency converter including third mixer means and a second local oscillator for converting the output signal from said intermediate frequency stage to a second intermediate frequency signal having a carrier frequency equal to the frequency of said second local oscillator; and (b) a switching detector connected between said frequency converter and said second local oscillator for demodulating an envelope signal component of said second intermediate frequency signal.

13. Apparatus for cancelling a ghost signal in a television receiver comprising:

(a) signal input means including a radio frequency stage for deriving a radio frequency signal which includes a desired signal and a ghost signal, the ghost signal being delayed by a time $\tau_o$ as compared with the desired signal;

(b) subtracting means connected to said signal input means;

(c) a first mixer connected to said subtracting means;

(d) a local oscillator connected to said first mixer;

(e) an intermediate frequency stage connected to said first mixer;

(f) a detector connected to said intermediate frequency stage for demodulating an envelope signal component of the intermediate frequency signal from said intermediate frequency stage;

(g) carrier wave forming means deriving an output carrier signal having an intermediate frequency corresponding to the carrier frequency of the output signal from said intermediate frequency stage;

(h) variable delay means connected to said detector for delaying the envelope signal therefrom by the time $\tau_o$;

(i) a second mixer connected between said local oscillator and said carrier wave forming means for converting the frequency of the output signal from said carrier wave forming means to a radio frequency;

(j) an amplitude modulator connected between said second mixer and said variable delay means for amplitude modulating the frequency converted output carrier signal from the second mixer with the delayed envelope signal from said variable delay means;

(k) variable phase shift means for shifting the phase of the carrier signal component of the amplitude modulated signal produced by said amplitude modulator by an amount corresponding to the time $\tau_o$;

(l) means connected to said amplitude modulator for supplying the output signal therefrom to said subtracting means for subtracting said output signal from said amplitude modulator from said derived radio frequency signal; and (m) an output circuit connected to said detector to provide a video signal from which said ghost signal is substantially cancelled.

14. The apparatus of claim 1 wherein said means for supplying the signal derived from said amplitude modulator means to said subtracting means comprises a vestigial side band filter and level controlling means connected in cascade circuit.

15. The apparatus of claim 14 wherein said subtracting means receives a radio frequency signal from said signal input means, and further comprising mixer means coupled to said cascade circuit for converting the signal derived from said amplitude modulator means to a radio frequency signal.

16. The apparatus of claim 1 wherein said carrier wave generating means comprises filter means coupled to said signal input means for producing a carrier signal whose frequency is equal to the carrier frequency of the received amplitude modulated signal; and limiter amplifier means coupled to said filter means for providing said carrier signal of substantially constant amplitude.

17. The apparatus of claim 16 further comprising a phase locked loop coupled to said limiter amplifier means for generating a local carrier whose phase is locked to the phase of said carrier signal.

* * * * *